United States Patent
Li et al.

(10) Patent No.: US 12,201,950 B2
(45) Date of Patent: Jan. 21, 2025

(54) SPIRAL-STRUCTURED THREE DIMENSIONAL POROUS GRAPHENE OXIDE-BASED MEMBRANE FOR STABLE ULTRAFAST FILTRATION

(71) Applicant: Versitech Limited, Hong Kong (CN)

(72) Inventors: Xiao Yan Li, Hong Kong (CN); Hai Bo Li, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 919 days.

(21) Appl. No.: 17/058,927

(22) PCT Filed: Jun. 14, 2019

(86) PCT No.: PCT/CN2019/091259
§ 371 (c)(1),
(2) Date: Nov. 25, 2020

(87) PCT Pub. No.: WO2019/238119
PCT Pub. Date: Dec. 19, 2019

(65) Prior Publication Data
US 2021/0213395 A1 Jul. 15, 2021

Related U.S. Application Data

(60) Provisional application No. 62/685,457, filed on Jun. 15, 2018.

(51) Int. Cl.
B01D 71/02 (2006.01)
B01D 69/12 (2006.01)

(52) U.S. Cl.
CPC ...... B01D 71/0211 (2022.08); B01D 69/1214 (2022.08); B01D 71/0212 (2022.08);
(Continued)

(58) Field of Classification Search
None
See application file for complete search history.

(56) References Cited

FOREIGN PATENT DOCUMENTS

| CN | 103127910 A | 6/2013 |
|---|---|---|
| CN | 104118866 A | 10/2014 |

(Continued)

OTHER PUBLICATIONS

Qinmo Luo, et al., Hollow microcapsules by stitching together of graphene oxide nanosheets with a di-functional small molecule, Carbon, vol. 106, 2016, pp. 125-131 (Year: 2016).*

(Continued)

*Primary Examiner* — Jason M Greene
*Assistant Examiner* — Eric J McCullough
(74) *Attorney, Agent, or Firm* — SALIWANCHIK, LLOYD & EISENSCHENK (57) ABSTRACT

Devices and methods related to a graphene oxide-based membrane are provided. A method comprises immersing graphene oxide-based layers in a water-based solution, stirring the water-based solution in a swirling motion until the graphene oxide-based layers each physically curve, adding a crosslinker to the water-based solution to cause the formation of saccate graphene oxide-based cells that are connected to each other via channels, and stacking the saccate graphene oxide-based cells on a substrate to form a graphene oxide-based membrane.

16 Claims, 10 Drawing Sheets

(52) U.S. Cl.
CPC ...... *B01D 2323/10* (2013.01); *B01D 2323/30* (2013.01); *B01D 2325/04* (2013.01)

(56) References Cited

FOREIGN PATENT DOCUMENTS

| CN | 104743549 A | 7/2015 |
| CN | 104743550 A | 7/2015 |
| CN | 107810049 A | 3/2018 |
| WO | WO-2015/168411 A1 | 11/2015 |

OTHER PUBLICATIONS

Joonsuk Oh, et al., Graphene oxide porous paper from amine-functionalized poly(glycidyl methacrylate)/graphene oxide core-shell microspheres, J. Mater. Chem., 2010, 20, 9200-9204 (Year: 2010).*

Nam Hoon Kim, et al., Simultaneous reduction, functionalization and stitching of graphene oxide with ethylenediamine for composites application, J. Mater. Chem. A, 2013, 1, 1349-1358 (Year: 2013).*

Aravand, M.A. and Semsarzadeh, M.A. (2008), Particle Formation by Emulsion Inversion Method: Effect of the Stirring Speed on Inversion and Formation of Spherical Particles. Macromol. Symp., 274: 141-147. (Year: 2008).*

Sanliang Zhang, Yueming Li, Ning Pan, Graphene based supercapacitor fabricated by vacuum filtration deposition, Journal of Power Sources, vol. 206, 2012, pp. 476-482 (Year: 2012).*

Peng Gao, et al., Multifunctional graphene oxide-TiO2 microsphere hierarchical membrane for clean water production, Applied Catalysis B: Environmental, vols. 138-139, 2013, pp. 17-25 (Year: 2013).*

International Search Report dated Sep. 5, 2019 in International Application No. PCT/CN2019/091259.

Chen, Y. et al., "Graphene oxide-chitosan composite hydrogels as broad-spectrum adsorbents for water purification", Journal of Materials Chemistry A, 2013, 1:1992-2001, The Royal Society of Chemistry.

Abolhassani, M. et al., "Scalable Chitosan-Graphene Oxide Membranes: The Effect of GO Size on Properties and Cross-Flow Filtration Performance", ACS Omega, 2017, 2:8751-8759, American Chemical Society.

* cited by examiner

SPIRAL-STRUCTURED THREE DIMENSIONAL POROUS GRAPHENE OXIDE-BASED MEMBRANE FOR STABLE ULTRAFAST FILTRATION

This application is the U.S. national stage application of PCT/CN2019/091259, filed Jun. 14, 2019, which claims priority from U.S. Provisional Patent Application Ser. No. 62/685,457 filed Jun. 15, 2018, the disclosure of each of which is incorporated herein by reference in its entirety.

FIELD OF INVENTION

This disclosure relates to a graphene oxide-based membrane, including methods of manufacturing the membrane and for using the membrane in water treatment and purification.

BACKGROUND OF THE INVENTION

Membranes operate by excluding certain species based upon their geometric size and rely upon nanopores or nanochannels in the membrane to reject the species. Decreasing the size of the nanopores or nanochannels can improve the membrane's ability to reject certain species, but can also negatively impact permeation through the membrane. These negative impacts can result in membrane fouling and increased energy consumption. For industrial applications, a membrane should provide both a high rejection rate of undesirable species and a large water flux coupled with low energy consumption and good stability.

BRIEF SUMMARY OF THE INVENTION

In an embodiment of the subject invention, a method of manufacturing a graphene oxide (GO)-based membrane comprises: (1) producing curved graphene oxide (GO) layers in a water swirl and using a crosslinker to link the GO layers together to form saccate GO cells connected to each other via channels; and (2) providing a stacked arrangement of the saccate GO cells to form a GO-based membrane.

In another embodiment, a method of separating chemicals from a fluid stream by using the GO-based membrane comprises: (1) adjusting the filtration pressure to separate different chemicals from a fluid stream during a purification process; and (2) backwashing the GO-based membrane in order to preserve the serviceable life span of the GO-based membrane.

DETAILED DISCLOSURE OF THE INVENTION

The following disclosure and exemplary embodiments are presented to enable one of ordinary skill in the art to make and use a spiral structured three dimensional porous graphene membrane according to the subject invention. Various modifications to the embodiments will be readily apparent to those skilled in the art and the generic principles herein may be applied to other embodiments. Thus, the devices and methods related to the spiral structured porous graphene membrane are not intended to be limited to the embodiments shown, but are to be accorded the widest scope consistent with the principles and features described herein.

Graphene oxide (GO) layers that are curved, robust, and have saccate GO cells/cavities connected to each other by micro-channels can be fabricated in a water swirl with the addition of a crosslinker. A stacked arrangement of the saccate GO-based cells can be arranged to form a GO-based membrane with a controllable cell size. GO-based membranes can be used as nanofiltration membranes, biofiltration membranes, ion exchange membranes, and desalination membranes for water treatment, purification, and pharmaceutical or chemical separation.

The term "membrane" as used herein refers to a selectively permeable material that selectively allows certain species to pass through it while retaining others within or on the material. The manner or mechanism of retention is determined by the structure of membrane. Membrane operation can be based on geometrical size exclusion and use pores as gates to reject an unwanted species having a larger size than the membrane's gate size. Membrane operation can also be based on frictional resistance and use the channel surface to capture specific species through physical friction and/or chemical reactions. Embodiments of the subject invention employ a frictional resistance-based membrane operation to selectively permit or impede certain species from passing through the membrane.

As used, the term "GO-based membrane" refers to a membrane comprising or formed of GO, a material based on GO, or a GO composite. The materials based on GO refer to the derivatives of GO, but modified chemically, and having —COOH and/or —O—. The GO composite refers to a composite formed of GO, polymers, and/or particles adsorbed on the surface of the GO. Examples of the polymers include, but are not limited to, poly(dimethylsiloxane), poly(acryloyl-6-aminocaproic acid), fibroin, polyaniline, polysulfone, polystyrene, poly(methyl methacrylate), polyamide, polyaniline, poly(sodium 4-styrenesulfonate), polyimide, polyacrylamide, deoxyribonucleic acid, mixtures thereof, and copolymers thereof. Examples of the particles include carbon nanotubes, titanium dioxide particles, and/or silver nanoparticles. The GO-based sheets can have at least one polymer and particle that interact or combine with each other.

In an embodiment, each GO-based layer can be formed by a stack of two or more two-dimensional GO-based sheets that each have nanopores/gates. Each of the GO-based layers can have a lateral dimension in the range of approximately 10 µm to approximately 500 µm (for example, approximately 10 µm to approximately 20 µm, approximately 20 µm to approximately 50 µm, approximately 10 µm to approximately 100 µm, approximately 100 µm to approximately 150 µm, approximately 150 µm to approximately 160 µm, approximately 150 µm to approximately 200 µm, approximately 150 µm to approximately 500 µm, or approximately 350 µm to approximately 500 µm).

The "water swirl" or "water vortex" may be formed by stirring the water in a container. There are different water swirl shapes created by different stirring conditions. A water swirl has three key shapes used during manufacturing of the GO-based membrane. A first shape that is a vortex with a bottom center point at a height that is half of the total height of the water in the container. A second shape that is a planar swirl at the surface of the water in the container. A third shape that is a vortex having a planar bottom that has a width that is half of the width of the water in the container.

In various embodiments, all water swirl shapes from the first shape to the third shape may be used for the manufacturing of the GO-based membranes. In specific embodiments, the water swirl shapes used are the first shape and then the second shape, which are used to fabricate a more uniform and robust membrane.

The structure of GO-based layers can curve with the flow of the water swirl. The shape of the water swirl determines the degree of the curvature of the GO-based layers, which results in different overall structures. In some embodiments, the GO-based layers may be stacked together first in a solution and then curved together by the water swirl. The concentration of the GO-based layers to the water can be in a range of 6 g/L to 14 g/L.

Stacked GO-based layers can be crosslinked to form saccate cells in a water swirl. The crosslinker may, for example, be chitosan, ethylenediamine, lysine, diethylenetriamine, citric acid, or other chemicals with two or more —NH$_2$ and/or the functional groups reacting with —COOH and —O—. To control the crosslinking reaction, the crosslinker should be added after the curved GO-based layers are formed in the water swirl. In an embodiment, the concentration of the GO-based layers to water is below 30 g/L and the cross-linkers are added at a rate below 5 ml/min.

A crosslinker can crosslink the edge of different curved GO-based layers to form connected cavities described herein as saccate cells. The saccate cells' growth can be controlled by restricting the stirring speed of the solution. In one embodiment, the stirring speed can be in a range of 400 rpm to 1600 rpm. The solution can be stirred for a time period in a range of 6 minutes to 6000 minutes and at a temperature in a range of 40° C. to 99° C. This results in a GO-based membrane with a controllable size. For example, by controlling the conditions, GO-based layers can be larger than 10 µm and the channels formed can be larger than 0.3 µm.

The GO-based pieces containing the connected saccate cells can be stacked on a supporting substrate to form a GO-based membrane. The supporting substrate can comprise a mesh, a fiber, a foam, or a sponge with micrometer-size pores less than the size of the GO-based piece, but larger than the channel size of the GO-based piece. A solution of GO-based pieces can be filtered and then disposed on the supporting substrate to form a membrane by applying a suitable formation pressure.

The formation pressure of the membrane can be used to control the size and shape of the GO-based cells. By increasing the formation pressure, the size of the GO-based cells gradually decreases. This feature of the controllable cell size can be used to fabricate a GO-based membrane that selectively removes certain chemicals.

In some embodiments, in order to facilitate a backwashing operation, the edge of the membrane can be further sealed via hydrophobic adhesives after fixing the two sides of the membrane by their respective supporting substrates.

In various embodiments, the shape of the membrane depends on the thickness of the membrane and the shape of the supporting substrate. Therefore, the GO-based membrane may, for example, be a hollow fiber membrane, a flat-sheet membrane, a spiral wound membrane, or a tubular membrane.

The method of separating chemicals from a fluid stream by using the GO-based membrane comprises adjusting the filtration pressure to separate different chemicals from a fluid stream, while also meeting any energy consumption requirements.

In various embodiments, the GO-based membrane is configured to reject chemicals and heavy metal ions having a hydrated radius of at least about 0.5 nm. The GO-based membrane may directly be applied as a nanofiltration membrane, an ultrafiltration membrane, a biofiltration membrane, an ion-exchange membrane, and a desalination membrane for use in various applications such as water treatment, purification, pharmaceutical and chemical separation, and blood cleaning.

For example, a GO-based membrane can increase the rejection rate of dyes without reducing the water flux. Also, the GO-based membranes are suitable for the selective separation of ions from organics in a fluid stream. As further examples, the GO-based membranes are suitable for use in ultrafiltration to remove chemicals with a molecular weight larger than 10,000 g/mol or particles larger than 10 nm while retaining an ultra-high water flux. The membranes can capture microorganisms and are suitable for biofiltration to biologically degrade chemicals in water. In addition, the GO-based membranes can be modified to be suitable for ion exchange and desalination.

A backwashing procedure can be used to prolong the serviceable life span of the GO-based membrane. In various embodiments, the GO-based membrane may be backwashed to maintain filtration performance by using clean water with or without a regenerant. A small amount of the filtered effluent is also suitable for backwashing the GO-based membrane. A regenerant may, for example, be HCl, acetic acid, or ethanol. The concentration of the regenerant, generally, is low, ranging from 0.05% to 5% (v/v). The backwashing pressure, in various embodiments, can be a larger than the filtration pressure. For example, when the filtration pressure is 5.0 bar, the backwashing pressure may be 5.2 bar.

After backwashing, in some embodiments, the backwashing concentrate with the chemicals can be desorbed from a first GO-based membrane. The PH of the backwashing concentrate can then be adjusted to 7 by treating the concentrate with alkali. The treated backwashing concentrate can be further filtered by a second GO-based membrane. The treated backwashing concentrate can then be mixed with the influent of the first GO-based membrane, and then be further filtered achieve a zero discharge. In certain embodiments, exhausted GO-based membranes can be regenerated by acids with or without the help of other regenerants, or may be carbonized by heating for other applications, such as adsorption and coagulation.

Certain embodiments provide a method of separating organics and inorganics from a fluid stream by using the GO-based membrane. This method comprises: 1) adjusting the filtration pressure to separate different chemicals from a fluid stream, and 2) backwashing the GO-based membrane to prolong the serviceable life span and/or achieve a zero discharge of any backwashing concentrate.

In an embodiment, a GO-based membrane is configured to reject organics and inorganics having a hydrated radius of at least 0.4 nm.

In an embodiment, a GO-based membrane can achieve a porous structure with an average pore size of 15 μm and a thickness of 2 cm. Assuming a uniform energy input, this GO-base membrane demonstrates a 15 times larger permeability and can remove 12% more Mordant Black T dye than a traditional layer-by-layer GO thin membrane.

Three-dimensional porous GO-based membranes can be manufactured by physically curving and chemically crosslinking the GO-based layers in a water swirl. This may involve (a) selecting the suitable cross-linkers with two or more primary amine groups, such as chitosan, lysine, ethylenediamine, and diethylenetriamine; (b) strengthening the GO-based layers to avoid negative impacts of the internal nanopores during the oxidation process of graphite; (c) stitching the edge of different GO-based layers to form cavities/cells; and (d) controlling the reaction rate between the carboxylic acid and epoxy groups of GO and the primary amine groups of the cross-linkers.

By selecting suitable crosslinkers, strengthening the GO-based layers, stitching the edges of different GO-based layers, and controlling the reaction rate; the size of the cavities/cells can be adjusted to meet the demands of different filtration processes. In one embodiment, the size of the cavities/cells is in a range of 10 nm to 400 μm. To achieve the needed size of the cavities/cells, manufacturing factors can include the shape of the water swirl, the mass ratio of a GO-based sheet to the crosslinker, the temperature, and the formation pressure. Additionally, the filtration pressure should be optimized during filtration.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

As further examples, the membranes disclosed herein are suitable for the selective separation of ions and organics, the selective separation of different ions, the selective separation of viruses and red blood cells, based on the size, the charge property, and/or the hydrophilicity.

Example 1-A: Fabrication of Chitosan-Crosslinked GO (CcGO) Pieces

GO-based sheets having a length, a width, and a thickness of 200 μm, 150 μm, and 5 μm, respectively, were prepared by the modified Hummers' method and dispersed in deionized water by sonication to make a solution of GO-based sheets with a concentration of 9.0 g/L. Then, this solution of GO-based sheets was stirred at a speed of 1000 rpm at 60° C. to form a water swirl, which caused the sheets to curve. An isopyknic chitosan (1.8 g/L) solution with acetic acid (2% v/v) was then added at a rate of 10 ml/h to crosslink the GO-based sheets to form the CcGO pieces. The CcGO pieces were then washed with deionized water.

Example 1-B: Fabrication of Chitosan-Crosslinked GO Membranes

Figure 1:
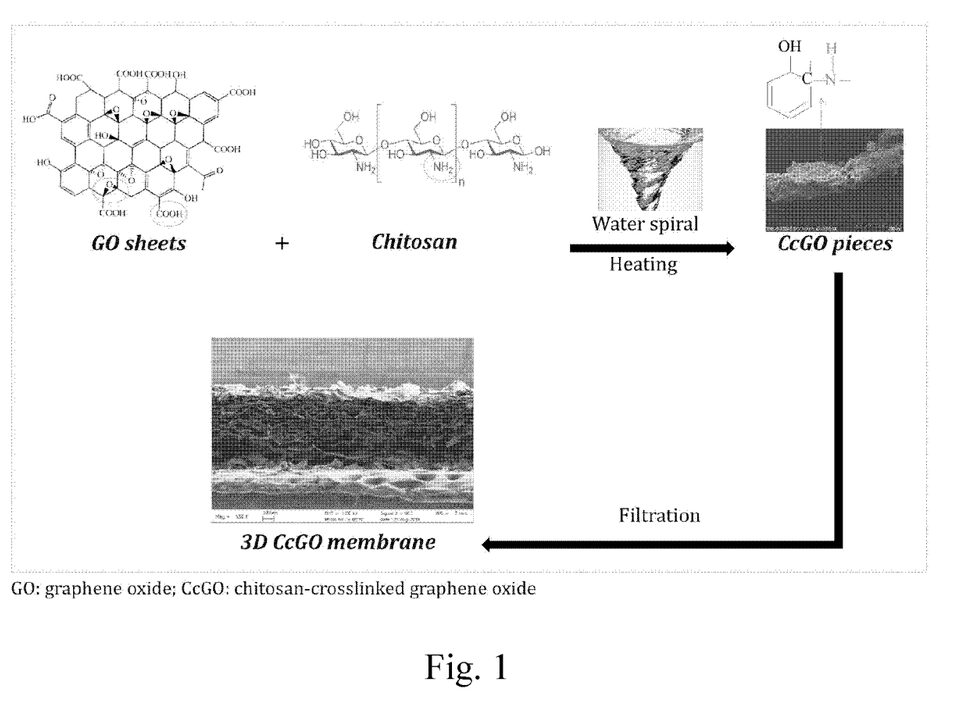
FIG. 1 is a schematic diagram of a process of manufacturing a three-dimensional (3D) porous graphene oxide (GO)-based membrane crosslinked by chitosan (CcGO).
Figure 2A:
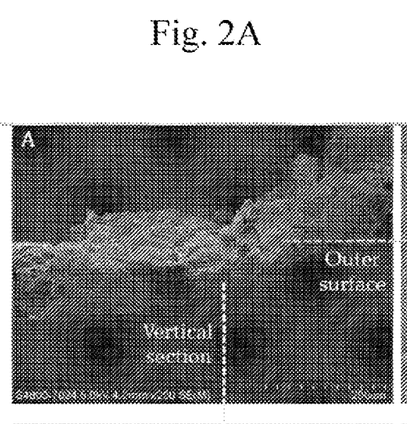
FIG. 2A shows an SEM image of a CcGO piece.
Figure 2B:
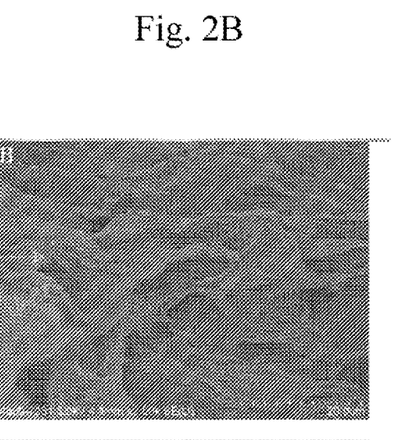
FIG. 2B shows an SEM image of an outer surface of the CcGO piece.
Figure 2C:
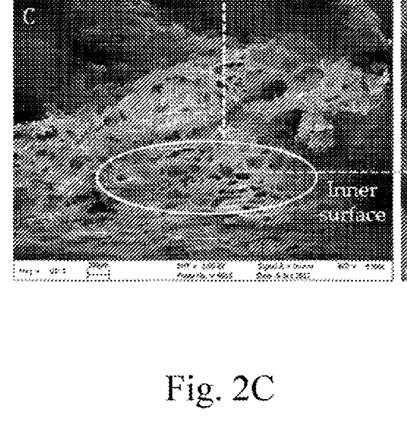
FIG. 2C shows an SEM image of a vertical section of the CcGO piece.
Figure 2D:
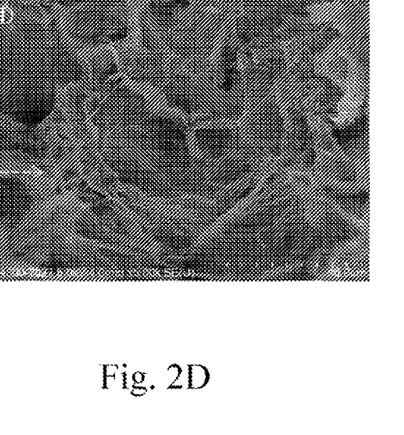
FIG. 2D shows an SEM image of an inner surface of the CcGO piece.
Figure 3A:
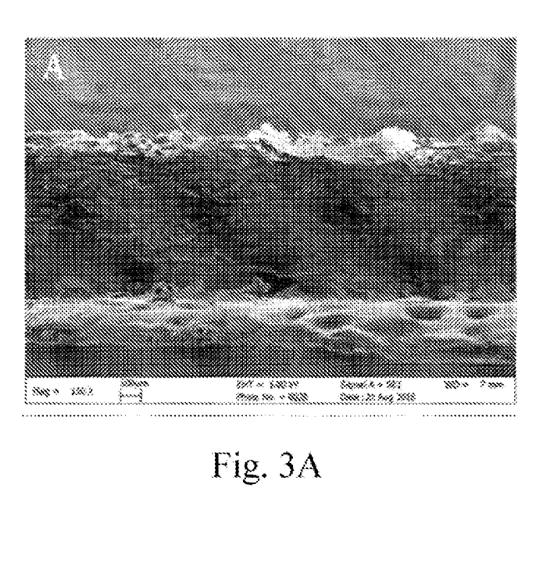
FIG. 3A shows a 100 μm scale SEM image of the vertical section of the CcGO membrane formed by stacking the CcGO pieces manufactured under a stirring speed of 600 rpm.
Figure 3B:
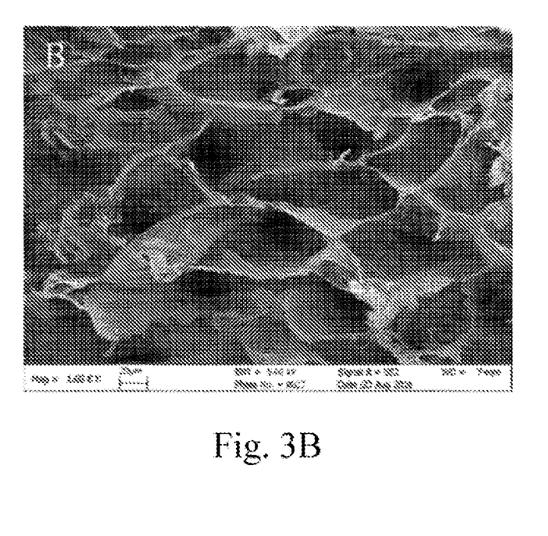
FIG. 3B shows a 20 μm scale SEM image of the vertical section of the CcGO membrane formed by stacking the CcGO pieces manufactured under a stirring speed of 600 rpm.
Figure 3C:
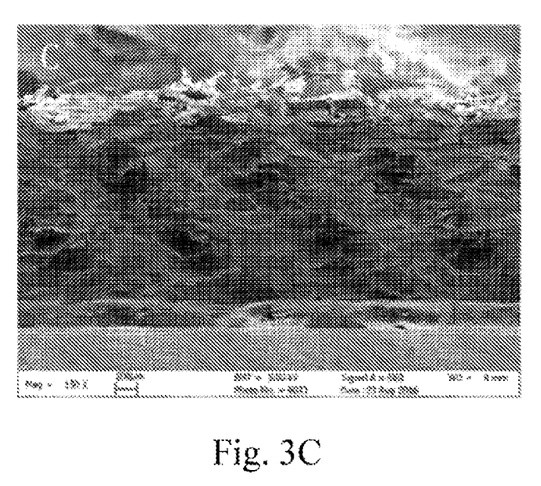
FIG. 3C shows a 100 μm scale SEM image of the vertical section of the CcGO membrane formed by stacking the CcGO pieces manufactured under a stirring speed of 1000 rpm.
Figure 3D:
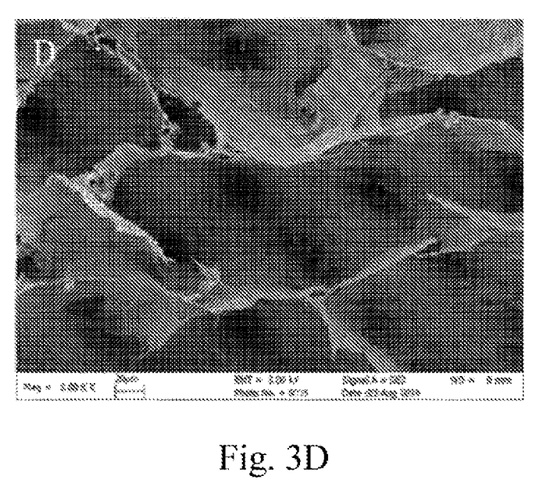
FIG. 3D shows a 20 μm scale SEM image of the vertical section of the CcGO membrane formed by stacking the CcGO pieces manufactured under a stirring speed of 1000 rpm.
Figure 3E:
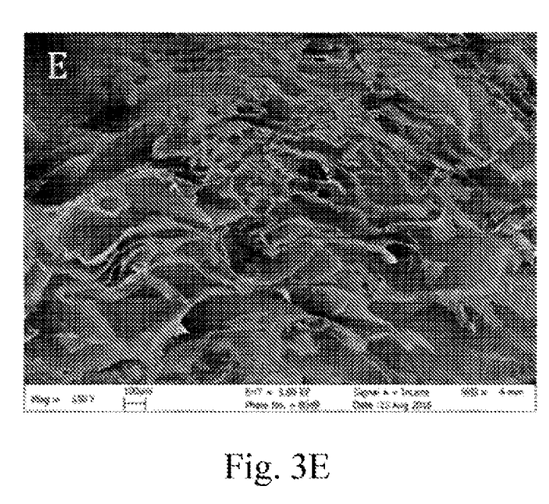
FIG. 3E shows a 100 μm scale SEM image of the vertical section of the CcGO membrane formed by stacking the CcGO pieces manufactured under a stirring speed of 1600 rpm.
Figure 3F:
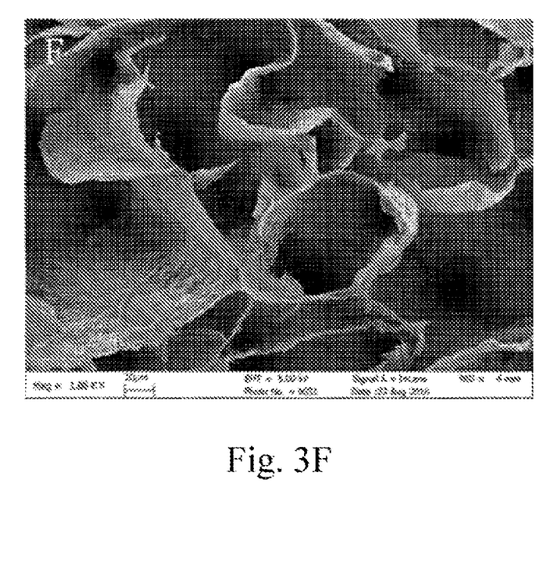
FIG. 3F shows a 20 μm scale SEM image of the vertical section of the CcGO membrane formed by stacking the CcGO pieces manufactured under a stirring speed of 1600 rpm.

The CcGO pieces were disposed on a sponge membrane with 200 μm-size pores under a formation pressure of 0.2 MPa. Then, a second sponge membrane with 200 μm-size pores was disposed on the opposite side of the CcGO pieces. Finally, the CcGO membrane was sealed by a customized device and washed by deionized water to form a new CcGO filter (a schematic diagram illustrating the manufacturing process of the porous CcGO membrane is seen in FIG. 1).

Example 1-C: Characterizations of Chitosan-Crosslinked GO Membranes

Figure 5:
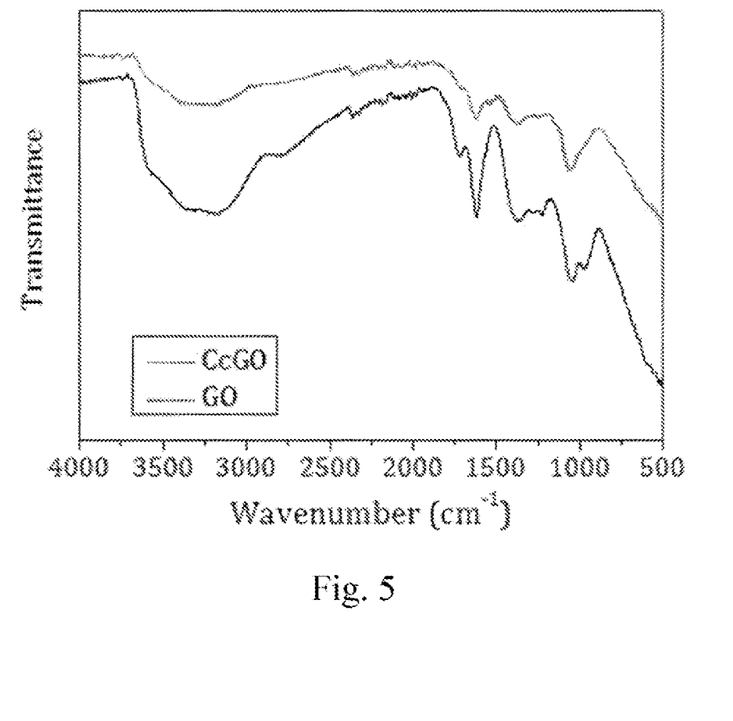
FIG. 5 is a plot of the Fourier-transform infrared spectroscopy (FTIR) of GO-based sheets and chitosan-cross-linked GO (CcGO) membranes.

Physiochemical properties of the CcGO membrane were investigated by using SEM, BET, and FTIR techniques. FIGS. 2A-2D show SEM images of an overall CcGO piece, the outer surface, the vertical section, and the inner surface of the CcGO piece, respectively. The CcGO piece had a porous structure with pores having a size of approximately 70 μm and plicated inner and outer surfaces. The CcGo pieces were disposed on the supporting layer to form a CcGO membrane with uniform cavities/cells. In certain embodiments, the stirring speed should be held under 1500 rpm to avoid a chaotic porous structure caused due to the turbulence of the water swirl. As seen in the FTIR results in FIG. 5, the peaks of C—O—C at 985 nm and at 1260 nm and the peak of C=O at 1720 nm disappeared after the use of chitosan, while there were three small peaks of amide group at 1517 nm, 1533 nm, and 1559 nm, demonstrating that the GO-based sheets were crosslinked by the chitosan.

Example 1-D: Experimental Results on Dye Removal

Figure 6:
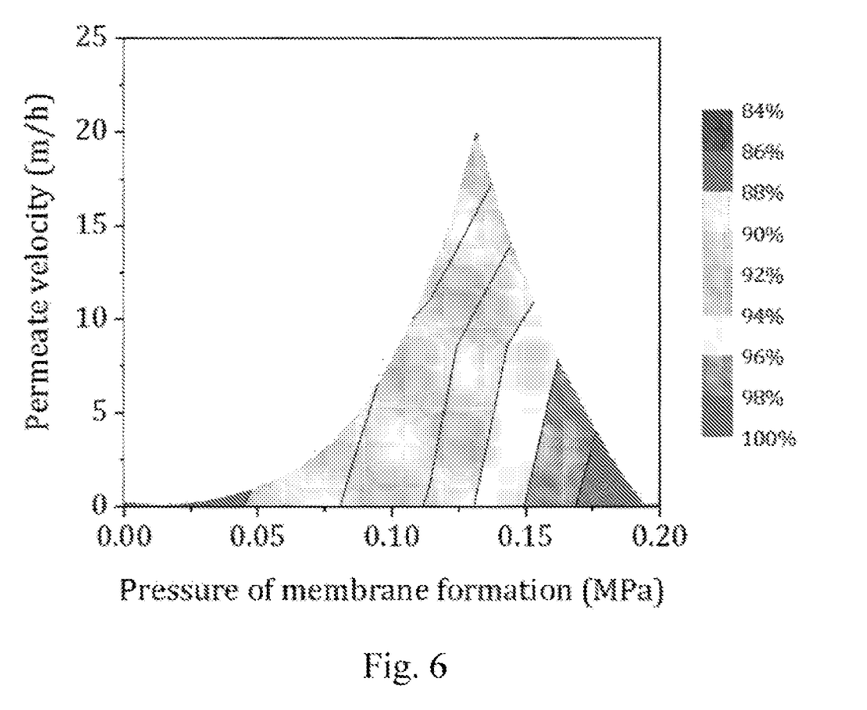
FIG. 6 is a plot showing the removal percentage of acidic mordant black dye using different CcGO membranes formed under different pressure conditions and under different filtration pressure conditions for a period of one hour.

To demonstrate the filtration performance of the CcGO membrane, the rate of removal of acidic mordant black dye at different filtration velocity levels and at different formation pressure levels of the membrane were investigated. The CcGo membrane was used to filter acidic mordant black dye having a molecular weight of 461 at concentration of 1 g/L. The CcGO membrane had a mass of 0.2 g, a diameter of 1.8 cm, and a thickness of 1 cm. As seen in FIG. 6, two general trends were revealed: (1) the maximum filtration velocity decreased with the increase of the formation pressure of the CcGO membrane; and (2) the removal rate increased with the decrease of the filtration velocity. The formation pressure and the filtration velocity can be adjusted to suit different applications. For example, the CcGO membrane formed under 0.16 MPa and operated at a filtration velocity of 7 m/h could remove 96% of the acid mordant black dye for at least one hour.

Example 1-E: Experimental Results of Selective Removal of Dyes

Figure 7:
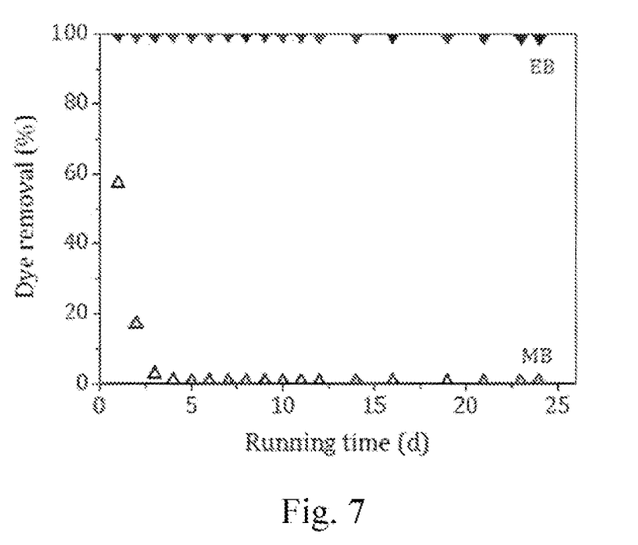
FIG. 7 is a plot showing the percentage of removal of Evans blue (EB) dye and methylene blue (MB) dye using a CcGO membrane.

To demonstrate the selective filtration performance of the CcGO membrane, a comparison of the removal of two different dyes of Evans blue (EB) and methylene blue (MB) was performed by using the CcGO membrane filtration for a 25-day period. A CcGO membrane was fabricated with a formation pressure of 0.18 MPa. The two dyes were passed through the CcGO membrane at a filtration velocity of 0.15 m/h. As shown in FIG. 7, after three days, the CcGO membrane only removed the EB dye and allowed the MB dye to pass through the membrane.

Example 1-F: Experimental Results of Backwashing Efficiency

Figure 8:
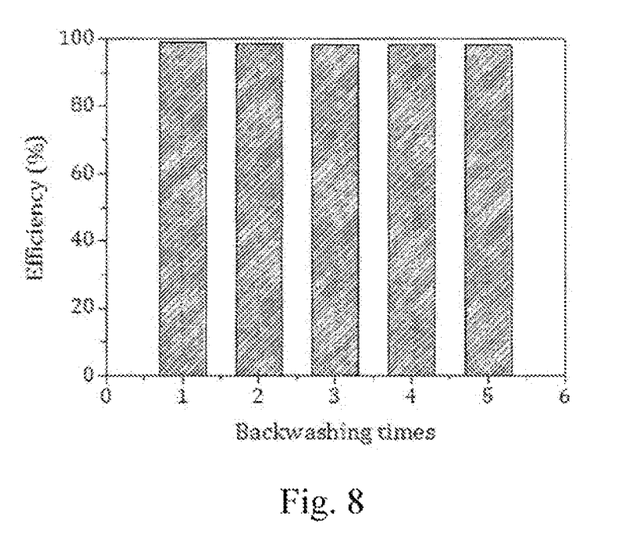
FIG. 8 is a plot showing backwashing efficiency of the CcGO membrane for removal of the EB dye.

The backwashing efficiency of the CcGO membrane for EB dye removal was investigated for five periods of twenty days each. After each twenty day period, the CcGO membrane was backwashed by 0.2% (v/v) HCl solution. As seen in FIG. 8, after 5 periods of backwashing, the membrane still could remove 99.8% of the EB dye.

Example 2-A: CcGO Membranes

The CcGO pieces manufactured in example 1-A were disposed on a sponge membrane with 200 μm-size pores using a formation pressure of 0.8 MPa. Then, a second sponge membrane with 200 μm-size pores was disposed on the opposite side of the CcGO pieces. Finally, the CcGO membrane was sealed by a customized device and washed with deionized water.

Example 2-B: Experimental Results of Selective Separation of Organics and Inorganics Experiments were performed to demonstrate the selective separation of organics and inorganics by the membrane. As seen in Table 1, the CcGO membrane could efficiently remove the organics, including the organics with a low molecular weight (MW). The membrane had a mass of 0.3 g, a diameter of 1.8 cm, and a thickness of 2 cm. 99% of the organics were removed with a permeance of 0.15 m/h. Likewise, the CcGO membrane permitted inorganic ions, including $Na^+$, $Li^+$, $Ag^+$, and $Au^+$ to pass through the membrane. Hence, the CcGO membrane can be used for selective separation of organic and inorganic materials.

TABLE 1

| Performance of a CcGO membrane | | | | | |
|---|---|---|---|---|---|
| Organics | MW | Concentration | Permeance (m/h) | Running time for 99% removal (d) | Removal efficiency after 5-day running (%) |
| Evans blue | 961 | 20 mg/L | 0.15 | 6 | 99.2 |
| Methyl orange | 327 | 20 mg/L | 0.15 | 3 | 96.3 |
| Methylene blue | 320 | 20 mg/L | 0.15 | 1 | 93.8 |
|  |  | 2 mg/L | 0.15 | 15 | 100.0 |
| Rhodamine B | 479 | 2 mg/L | 0.15 | 5 | 99.0 |
| Bisphenol A | 228 | 600 μg/L | 0.07 | 2 | 90.6 |

Example 3: Enhanced Chitosan-Crosslinked GO Membranes for Selective Separation of Bivalent Cations and Monovalent Cations A CcGO membrane manufactured as in example 2 was shown to separate bivalent cations and monovalent cations by adjusting the filtration pressure. The CcGO membrane had a mass of 0.3 g, a diameter of 1.8 cm, and a thickness of 2 cm. The filtration velocity of the CcGO membrane was set at 0.02 m/h by adjusting the filtration pressure to 0.21 MPa, the CcGO membrane captured the $Mg^{2+}$ ions and let the $Li^+$ pass through, as shown in Table 2.

TABLE 2

| Performance of CcGO membrane | | | |
|---|---|---|---|
| Organics | Concentration | Removal efficiency after 1-day running (%) | Removal efficiency after 10-day running (%) |
| $Mg^{2+}$ | 35 mg/L | 99.9 | 99.8 |
| $Li^+$ | 1 mg/L | 5.6 | 0.7 |

Example 4-A: Fabrication of Lysine-Crosslinked GO Pieces

GO sheets having a thickness of approximately 50 μm were prepared by the modified Hummers' method and dispersed in deionized water by sonication in order to make a solution of GO sheets with a concentration of 6.0 g/L. Then, the solution of GO sheets was stirred in swirling water at a speed of 800 rpm at 60° C., which caused the GO sheets to curve. An isopyknic lysine (3.0 g/L) solution with acetic acid (2% v/v) was then added at a rate of 20 ml/h in order to crosslink the GO sheets and form the lysine-crosslinked GO (LcGO) pieces. The LcGO pieces were then washed with deionized water.

Example 4-B: Fabrication of LcGO Membranes

The LcGO pieces were disposed on a sponge membrane with 60 μm-size pores under a formation pressure of 10 MPa to form an LcGO membrane. Finally, the LcGO membrane was washed with deionized water to form an LcGO filter.

Example 4-C: Experimental Results of Desalination

The ability of the LcGO membrane to remove $Na^+$ ions was investigated. The LcGO membrane had a mass of 0.2 g, a diameter of 1 cm, and a thickness of 0.5 mm. The LcGO membrane removed 99% of the $Na^+$ ions from a solution having a concentration of 30 g/L for a seven day period and at a filtration velocity of 0.004 m/h.

Example 5: Vortex Manufacture Technique

Figure 4:
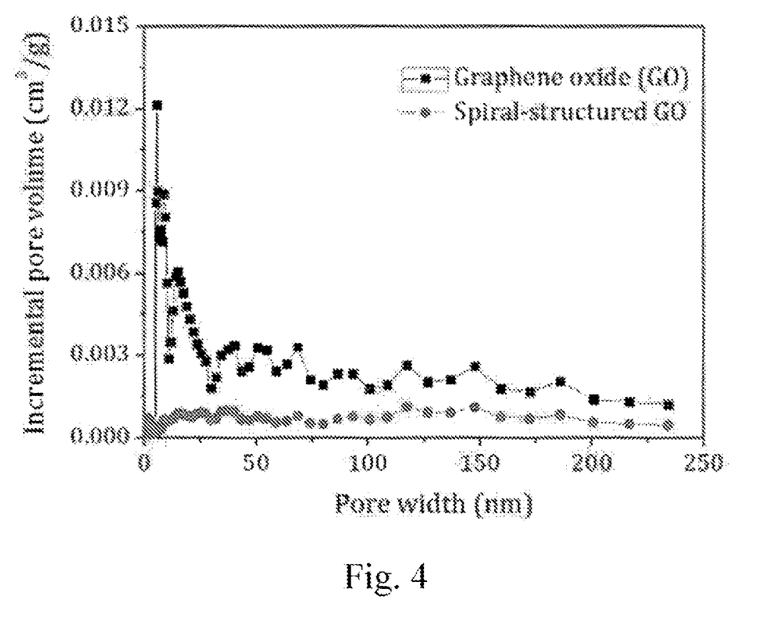
FIG. 4 is a plot comparing the incremental pore volume of two GO-based materials before and after the immersion and modification in a water spiral.
Figure 9:
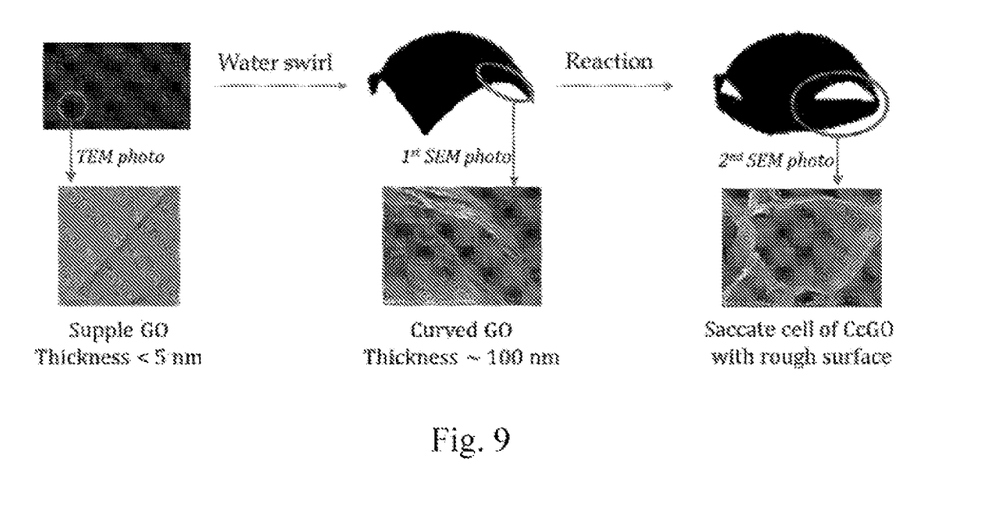
FIG. 9 illustrates the morphological change of GO during the fabrication of a GO-based membrane using a water-swirl technique.

Embodiments of the subject invention provide a vortex (or water-swirl) process for manufacturing a three dimensional porous GO-based membrane. The crosslinking agent can be any chemical with two or more primary amine groups, such as chitosan, lysine, ethylenediamine, and diethylenetriamine. The GO sheets can be strengthened (for example, by reducing the volume of nanopores, as seen in FIG. 4) and the edges of different GO sheets can be stitched to form cavities/cells during the manufacturing process. This process is illustrated in FIG. 9. FIG. 9 illustrates a GO-based sheet being subjected to a water swirl to form a curved and robust GO-based sheet. As seen in FIG. 9, the GO-based sheet has an initial thickness of less than 5 nm. However, due to adsorption, the thickness of the GO-based sheet increases to approximately 100 nm. The curved GO sheet then undergoes a reaction to form a saccate GO-based cell, as illustrated in FIG. 9.

The reaction rate between the carboxylic acid groups of GO and the primary amine groups of CS can be controlled during this process. Controlling the reaction rate can be achieved by controlling the order materials are added to the solution of GO-based sheets. Chitosan can be added to the solution of GO-based sheets while maintaining a high mass ratio of GO/CS. In one embodiment, the mass ratio of GO/CS can be in a range of 1 to 5. Second, an acidic environment should be maintained to reduce the reaction activity of the carboxylic acid groups of GO. Third, making the GO-based sheets curved in a water swirl to reduce the crosslinking reaction of the center of the curved GO-based sheets.

Figure 10:
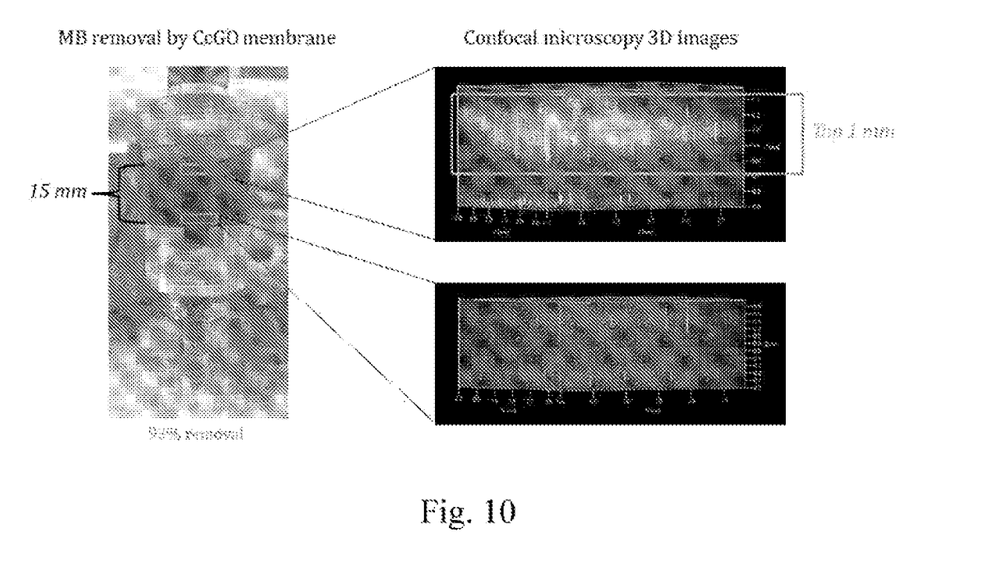
FIG. 10 shows confocal microscopy generated three dimensional images of a CcGO membrane retaining MB dye after seven days.

The GO-based can utilize the whole porous structure to capture the chemicals as shown in the confocal microscopy image of FIG. 10. A BET test can be used to characterize the GO-based membrane and show the sharp volume decrease (over 70%) of pores smaller than 20 nm and lack of increased volume of larger nanopores after crosslinking, as shown in FIG. 4.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1]. Chen, Y. Q., Chen, L. B., Bai, H., and Li, L., GO-chitosan composite hydrogels as broad-spectrum adsorbents for water purification, Journal of Materials Chemistry A, 2017 1 (6), 1992-2001.

[2]. Mojtaba Abolhassani, Chris S. Griggs, Luke A. Gurtowski, Jose A. Mattei-Sosa, Michelle Nevins, Victor F. Medina, Timothy A. Morgan, and Lauren F. Greenlee, Scalable Chitosan-GO Membranes: The Effect of GO Size on Properties and Cross-Flow Filtration Performance, ACS Omega 2017 2 (12), 8751-8759.

What is claimed is:

1. A method of manufacturing a graphene oxide-based membrane, comprising:

immersing a plurality of graphene oxide-based layers in a water-based solution;

stirring the water-based solution in a swirling motion until the plurality of graphene oxide-based layers each physically curve;

adding a crosslinker to the water-based solution; simultaneously forming a plurality of saccate graphene oxide-based cells and covalently linking the plurality of saccate graphene oxide-based cells via tubular graphene channels, while being stirred in the water-based solution containing the crosslinker; and stacking the plurality of saccate graphene oxide-based cells on a porous substrate to form a graphene oxide-based membrane.

2. The method of claim 1, wherein the crosslinker comprises chitosan, ethylenediamine, lysine, diethylenetriamine, or citric acid.

3. The method of claim 1, wherein a shape caused by stirring the water-based solution comprises at least one of the following shapes:

a first shape being a vortex with a bottom center point at a height that is half of the total height of the water-based solution;

a second shape being a planar swirl at a surface of the water-based solution; and a third shape being a vortex having a planar bottom that has a width that is half of a width of the water-based solution.

4. The method of claim 3, further comprising:

swirling the water in a manner to form the first shape; and swirling the water in a manner to form the second shape.

5. The method of claim 1, further comprising:

adjusting a stirring speed to effectuate a desired level of curvature of each graphene oxide-based layer of the plurality of graphene oxide-based layers; and adjusting a concentration of the plurality of graphene oxide-based layers in the water-based solution to effectuate a desired level of curvature of each graphene oxide-based layer of the plurality of graphene oxide-based layers.

6. The method of claim 1, wherein each graphene oxide-based layer of the plurality of graphene oxide-based layers has a thickness larger than 15 nm.

7. The method of claim 5, wherein the concentration of the plurality of graphene oxide-based layers to the water-based solution is in a range of 6 g/L to 14 g/L.

8. The method of claim 1, wherein a mass ratio of the plurality of graphene oxide-based layers to the crosslinker is in a range of 1 to 5.

9. The method of claim 1, wherein a diameter of the channels is in a range of 0.3 μm to 400 μm.

10. The method of claim 1, wherein stacking the plurality of saccate graphene oxide-based cells on the porous substrate further comprises:

adjusting a formation pressure to achieve a desired size of the graphene oxide-based membrane, wherein the desired size is one or both of a pore size and a thickness of the membrane.

11. The method of claim 1, wherein stacking the plurality of saccate graphene oxide-based cells on the porous substrate further comprises:

disposing the plurality of saccate graphene oxide-based cells between two porous substrates to form the graphene oxide-based membrane; and adjusting a formation pressure to achieve a desired size of the graphene oxide-based membrane, wherein the desired size is one or both of a pore size and a thickness of the membrane.

12. The method of claim 10, wherein the porous substrate is a mesh, a fiber, a foam, or a sponge.

13. The method of claim 10, wherein the porous substrate comprises an array of pores, each pore having a respective minimum diameter that is larger than a respective maximum diameter of each channel integrating the saccate graphene oxide-based cells.

14. The method of claim 10, wherein the porous substrate comprises an array of pores, each pore having a respective maximum diameter that is smaller than a respective minimum length of each graphene oxide-based layer.

15. The method of claim 11, wherein the formation pressure is in a range of 0.01 MPa to 100 MPa.

16. A method of separating chemicals from a fluid stream by using a graphene oxide-based membrane, comprising:
preparing a graphene oxide-based membrane as described in claim 1;
adjusting a filtration pressure of influent passing through the graphene oxide-based membrane; and
backwashing the graphene oxide-based membrane to prolong serviceable life span of the graphene oxide-based membrane.

* * * * *